United States Patent [19]
Allen et al.

[11] Patent Number: 5,406,315
[45] Date of Patent: Apr. 11, 1995

[54] METHOD AND SYSTEM FOR REMOTE-SENSING INK TEMPERATURE AND MELT-ON-DEMAND CONTROL FOR A HOT MELT INK JET PRINTER

[75] Inventors: Ross R. Allen, Belmont; William J. West, Los Altos, both of Calif.

[73] Assignee: Hewlett-Packard Company, Palo Alto, Calif.

[21] Appl. No.: 923,121

[22] Filed: Jul. 31, 1992

[51] Int. Cl.⁶ .......................................... B41J 2/175
[52] U.S. Cl. ........................................ 347/7; 347/17; 347/19; 347/88; 374/20; 222/146.2
[58] Field of Search ............... 346/1.1, 75, 140 R; 374/16, 17, 18, 19, 20, 162, 163; 222/146.1, 146.2; 347/6, 7, 17, 19, 88, 99

[56] References Cited

U.S. PATENT DOCUMENTS

| | | | |
|---|---|---|---|
| 3,143,876 | 8/1964 | Wallgren | 374/17 |
| 4,593,292 | 6/1986 | Lewis | 346/1.1 |
| 4,607,266 | 8/1986 | DeBonte | 346/140 R |
| 4,667,206 | 5/1987 | DeYoung | 346/1.1 |
| 5,235,350 | 8/1993 | Lin et al. | 346/140 R |

FOREIGN PATENT DOCUMENTS

| | | | |
|---|---|---|---|
| 0178885 | 4/1986 | European Pat. Off. | 346/140 R |
| 55-84674 | 6/1980 | Japan | 346/75 |
| 58-162824 | 9/1983 | Japan | 374/19 |
| 62-21549 | 1/1987 | Japan | 346/140 R |
| 62-156963 | 7/1987 | Japan | 346/140 R |
| 62-156965 | 7/1987 | Japan | 346/140 R |
| 05-31917 | 2/1993 | Japan | 346/140 R |

OTHER PUBLICATIONS

Loiselle, J. T.; Bilevel Optical Ink Level Detector; IBM Technical Disclosure Bulletin; vol. 18, No. 4; Sep. 1975; 1095-96.

*Primary Examiner*—Benjamin R. Fuller
*Assistant Examiner*—John Barlow

[57] ABSTRACT

A method and system for regulating the temperature of a hot melt ink wherein light reflected from a phase change material adjacent to the ink is detected, and a closed loop control signal proportional to the intensity of the reflected light is generated. The control signal is applied to a heater element for the ink and provides good temperature control thereof. In addition, the phase change material is used to generate an ink level indication signal which is also processed in a closed loop servo system in order to provide control over levels of the hot melt ink during operation of an ink jet printhead. In the embodiment of the present invention for controlling both ink temperature and ink levels within a pen body housing, there is provided a means and method for simultaneously sensing the liquid level and temperature at the solid/liquid interface within the pen body housing. This is done by simultaneously detecting the reflectivity of separate phase change material components located within or adjacent to the pen body housing and then processing closed loop detection signals which are optically coupled by way of control logic from the separate phase change material components to one or more heater elements located adjacent to the pen body housing. The present invention is also directed to a new and improved pen body construction which is uniquely suited for implementing the above novel method and system. This construction employs a flex circuit, an ink jet printhead and a multiple sensor assembly mounted adjacent to one wall of the pen body housing.

20 Claims, 7 Drawing Sheets

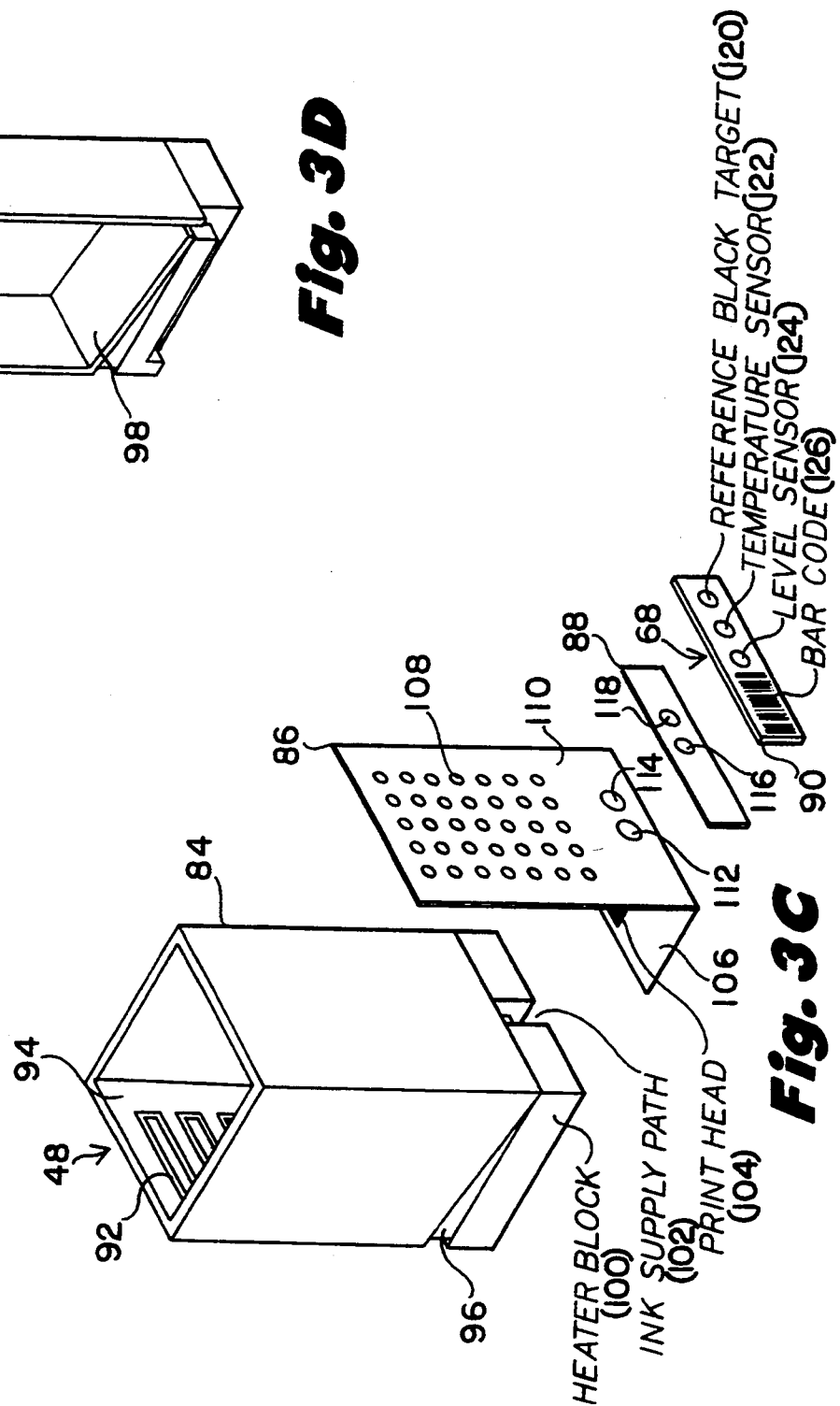

Rapid heating & cooling
heating @ 0.42°C/sec
cooling @ 0.52°C/sec

Detail from (4A)

Slow heating & cooling
heating/cooling @ 0.11°C/sec

METHOD AND SYSTEM FOR REMOTE-SENSING INK TEMPERATURE AND MELT-ON-DEMAND CONTROL FOR A HOT MELT INK JET PRINTER

TECHNICAL FIELD

This invention relates generally to thermal ink jet printers operative using hot melt solid inks and more particularly to an improved method and system for controlling both temperature and ink levels of such inks within the print cartridges for these printers.

BACKGROUND ART

In recent years, different types of solid hot melt or phase change inks have been proposed and used as an alternative to the older and well developed liquid inks for printheads of thermal ink jet printers. As is generally well known in the art, these solid hot melt inks have been developed to undergo a phase change between solid and liquid when heated up to a predetermined elevated temperature. These solid phase change inks have proven to be an attractive alternative to liquid inks for certain types of printing applications because of the recent improvements in print quality on a wide variety of papers, improved waterfastness, and a potential for a higher throughput.

The delivery temperature of the hot melt ink in an ink jet printhead is normally in the range of 60°–200° C., with the precise value within this range depending upon the ink formulation. To maintain desirable physical properties for ink drop ejection and drop volume consistency, the ink delivery temperature must be controlled within a narrow range around a nominal value, typically plus or minus 5° C. or better. The regulation of this temperature poses challenges for accurate, low cost, and reliable means suitable for use with color ink jet print cartridges using hot melt inks.

Several approaches have been proposed in the prior art for providing this temperature control, and examples of these approaches may be found in U.S. Pat. No. 4,490,731 issued to Vaught, U.S. Pat. No. 4,667,206 issued to DeYoung, U.S. Pat. No. 4,631,557 issued to Cooke, U.S. Pat. No. 4,607,266 issued to DeBonte, and U.S. Pat. No. 4,593,292 issued to Lewis, all incorporated herein by reference. However, generally speaking, these prior approaches have not proven entirely satisfactory because, among other reasons, they have employed temperature sensors such as thermocouples, thermistors, and temperature sensitive resistors and associated circuitry having a relatively high degree of cost and complexity associated therewith. In addition, these prior art approaches have the further disadvantage of requiring dedicated interconnect pads, carriage printed circuit board circuitry and trailing cables for passing low power analog signals to these temperature sensors which are located adjacent to the supply of hot melt ink within the print cartridge.

DISCLOSURE OF INVENTION

The general purpose and principal object of the present invention is to provide a novel alternative approach with respect to the above described prior art methods for controlling the temperature and ink level of hot melt inks and which overcomes most, if not all, of the above disadvantages associated with using temperature sensors of the above type.

Another object of this invention is to provide a new and improved method and system of hot melt ink control of both temperature and ink level within a print cartridge for an ink jet printer.

Another object of this invention is to provide a new and improved method and system of the type described which does not add interconnect pads, carriage printed circuit board circuitry, or trailing cables to the system beyond that required for heater power for the supply of hot melt ink.

A feature of this invention is the provision of a new and improved method and system of the type described wherein the precision of mechanical alignment between the print cartridge and a photodetector is assured by normal tolerances within the scan axis mechanism of the system, and the scan axis servo position can be used to enable and identify measurements of both hot melt temperature and ink levels.

Another feature of this invention is the provision of a new and improved method and system of the type described wherein temperature sensors may be sealed within the ink cartridge body without passing low power analog signals through an electrical interconnect as is required by thermocouples, thermistors and temperature sensitive resistors. In this manner, the present system cost and complexity can be made significantly less than conventional systems for making precision temperature measurements.

Another feature of this invention is the provision of a new and improved method and system of the type described wherein the method of ink temperature and ink level regulation is based on remote thermometry which employs the observation of the reflectivity of a temperature sensitive material and which is particularly well suited to scanning carriage, color ink jet printers using multiple print cartridges.

Another feature of this invention is the provision of a new and improved method and system of the type described which includes simultaneously sensing the liquid level and temperature within a pen body housing. This is done by simultaneously detecting the reflectivity of separate phase-change material components for liquid phase temperature and liquid phase level within the pen body housing. These reflected light levels are processed into signals which are applied to a heating element to thereby control the rate of melting of solid ink to in turn thereby maintain a nominal level of the liquid phase.

Another feature of this invention is the provision of an improved pen body construction and implementation of the novel principles described herein which comprises a body casing on which a flex circuit and thermal ink jet (TIJ) printhead are mounted. The flex circuit is constructed to receive a sensor assembly which includes an ink temperature sensor, an ink level sensor, a bar code, and a black reference sensor. These sensors are electro-optically coupled in a closed loop feedback system to one or more heaters on the TIJ pen body housing to control both the ink temperature and ink level within the pen body housing in a manner more particularly described below. In this novel arrangement, a first internal heater is employed to control the ink level within the housing, whereas a second, block heater is employed to control ink temperature within the pen body housing. These two heaters are connected to operate in combination and simultaneously in a multi-path closed loop feedback system.

In accordance with the temperature control embodiment and method claim of the present invention, the above purpose and objects are accomplished by the provision of a method for regulating the temperature of a hot melt ink for an ink jet printer, including the steps of:

a. providing a selected material adjacent to a source of hot melt ink and having a refractive index which varies in a known manner as a function of temperature, b. projecting light onto a surface of the selected material and thereby reflecting light therefrom at an intensity level which is proportional to the temperature level within the liquid phase of the hot melt ink, c. sensing the intensity level of the reflected light and generating a temperature control signal in response thereto, and d. processing the temperature control signal to a heater element positioned adjacent to the source of hot melt ink on a print cartridge for thereby precisely controlling the temperature of the liquid phase of the hot melt ink within a predetermined tolerance range.

In accordance with a system embodiment and system claim for temperature control of the present invention, there is provided, in combination:

a. means for positioning a selected material adjacent to a source of hot melt ink and having a refractive index which varies in a known manner as a function of temperature, b. means for projecting light onto a surface of the selected material and thereby reflecting light therefrom at an intensity level which is proportional to the temperature level within the liquid phase of the hot melt ink, c. means optically coupled to light reflected from the selected material for detecting the intensity level thereof and generating a temperature control signal in response to the intensity level of the reflected light, and d. means coupled to the detecting means and connected between the detecting means and a heater element positioned adjacent to the supply of the liquid phase of the hot melt ink for processing a control signal to the heater element to maintain the temperature level thereof within a desired tolerance range.

In accordance with a system embodiment and claim for operation with both ink level and temperature control in accordance with the present invention, there is provided, in combination:

a. first and second phase change components mounted within a pen body housing, the first phase change component being responsive to the temperature of the liquid phase of the hot melt ink, and the second phase change component being placed near the nominal position of the desired ink level of the liquid phase of the hot melt ink, b. ink temperature detection means optically coupled to the first phase change component, c. ink level detection means optically coupled to the second phase change component, d. a first heater element disposed so as to raise the temperature of the liquid phase of the hot melt ink, and a second heater element disposed so as to melt the ink solid phase on demand, and e. closed loop control means connected between the ink temperature detection means and the ink level detection means and the heater elements for controlling the liquid phase temperature and melt rate of the solid phase within the pen body housing.

In accordance with a unique method for simultaneously controlling ink temperature and ink level within the pen body housing, the method includes the steps of simultaneously sensing the liquid level and temperature within the pen body housing. This is done by simultaneously detecting the reflectivity of separate phase change components located within the pen body housing to generate closed loop detection signals which are processed in a manner described in more detail below.

The above brief summary of the invention, together with its attendant objects, features, and related advantages will become better understood with reference to the following description of the accompanying drawings.

BRIEF DESCRIPTION OF THE DRAWINGS

FIG. 3A is not intended to show the complete ink jet printer implementation of the present invention, but rather an ink jet printhead schematic which teaches the basic principles of the invention.

FIG. 3C is an exploded perspective view showing a preferred detailed device implementation of the pen body housing shown only functionally in FIG. 3B.

FIG. 3D is a cross section view taken along lines D—D of FIG. 3C.

DETAILED DESCRIPTION OF THE DRAWINGS

Figure 1A:
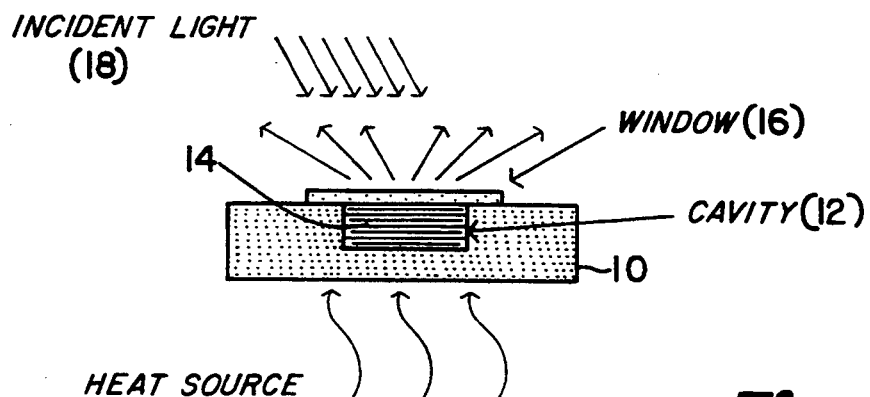
FIGS. 1A and 1B are abbreviated cross section and plan views, respectively, of a light absorbing cavity in the opaque state and useful on the print cartridge in carrying out the invention.

Referring now to FIG. 1A, there is illustrated the basic principle for reflected light thermometry useful in carrying out the invention. In FIG. 1A, a sensor 10 has a light absorbing cavity 12 therein, and the cavity 12 is typically 2 to 4 millimeters in diameter and 0.4 to 0.5 millimeters deep and is filled with a solid crystalline material. 14 which changes refractive index as a function of temperature. Below its melting point, the solid crystalline material 14 is opaque and reflects incident light, whereas at and above its melting point, the material 14 is a transparent liquid and absorbs light. The cavity 12 is sealed with a window 16 on one side thereof and is illuminated with a source of incident light 18. At low temperatures, the window 16 appears light colored, but at or above the ink delivery temperature (typically 20° C. above the ink's melting point), the window 16 appears black.

To be suitable for use in the present application, the phase-change material 14 should have: (a) a well defined melting point and (b) a freezing point identical to its melting point. The crystalline material 14 should further have: (c) a rapid phase transition, particularly recrystallization, and (d) a high thermal conductivity and a low heat of fusion compared to the hot melt ink which is being controlled. The material 14 should be (e) highly opaque and crystalline with a high refractive index and (f) stable under an indefinite number of freeze-thaw cycles and for sustained exposure at hot melt operating temperatures. The material 14 should also have (g) a low vapor pressure and (h) a low volume change upon melting. The properties identified as (a) through (d) above serve to reduce hysteresis and improve response time, whereas property (e) above provides a high contrast ratio for good photodetection. Property (f) above is required for reliability whereas properties (g) through (h) above minimize stresses within the cavity 12.

Several solids have been used in devices 10 actually constructed in order to demonstrate temperature regulation near 100° C. Two of these solids are known in the art as Ketjenflex and Kenamide-S. In the design of a practical sensor, the ink delivery temperature must first be determined based upon ink formulation and the desired physical properties of the liquid state, namely viscosity and surface tension. Next, the allowable variation in physical properties with temperature determines the temperature regulation tolerance. Finally, a material 14 must be used which changes phase at the ink delivery temperature and satisfies the above criteria. Liquid crystal materials may be developed which perform the same function as a solid crystalline, phase change material. However, there is concern that these organic compounds may not have the required stability at the typical operating temperatures for hot melt ink jet printers.

Figure 1B:
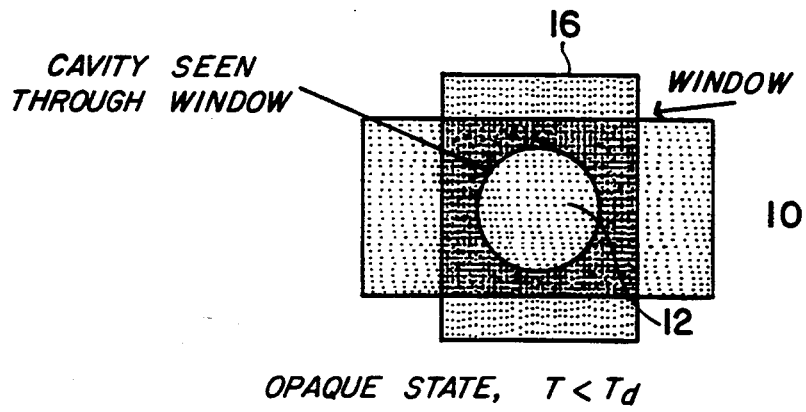

Referring now to FIG. 1B, this plan view illustrates the case where the material 14 within the cavity 12 is in an opaque state with the temperature, T, of the liquid being below the melting point temperature, $T_d$.

Figure 2A:
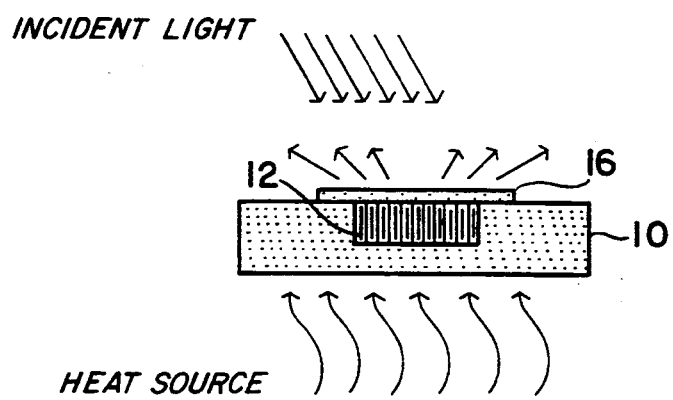
FIGS. 2A and 2B are abbreviated cross section and plan views, respectively, of the light absorbing cavity in a clear state.
Figure 2B:
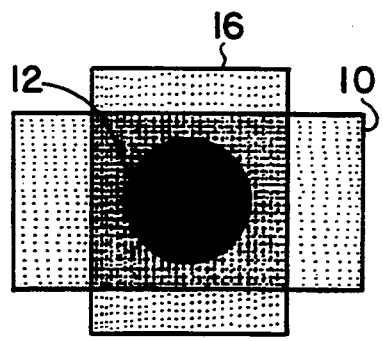

FIGS. 2A and 2B correspond structurally to FIGS. 1A and 1B, respectively, and illustrate the case where the material 14 and the cavity 12 is now in a clear state with the temperature, T, of the liquid equal to or above the melting point temperature, $T_d$.

Figure 3A:
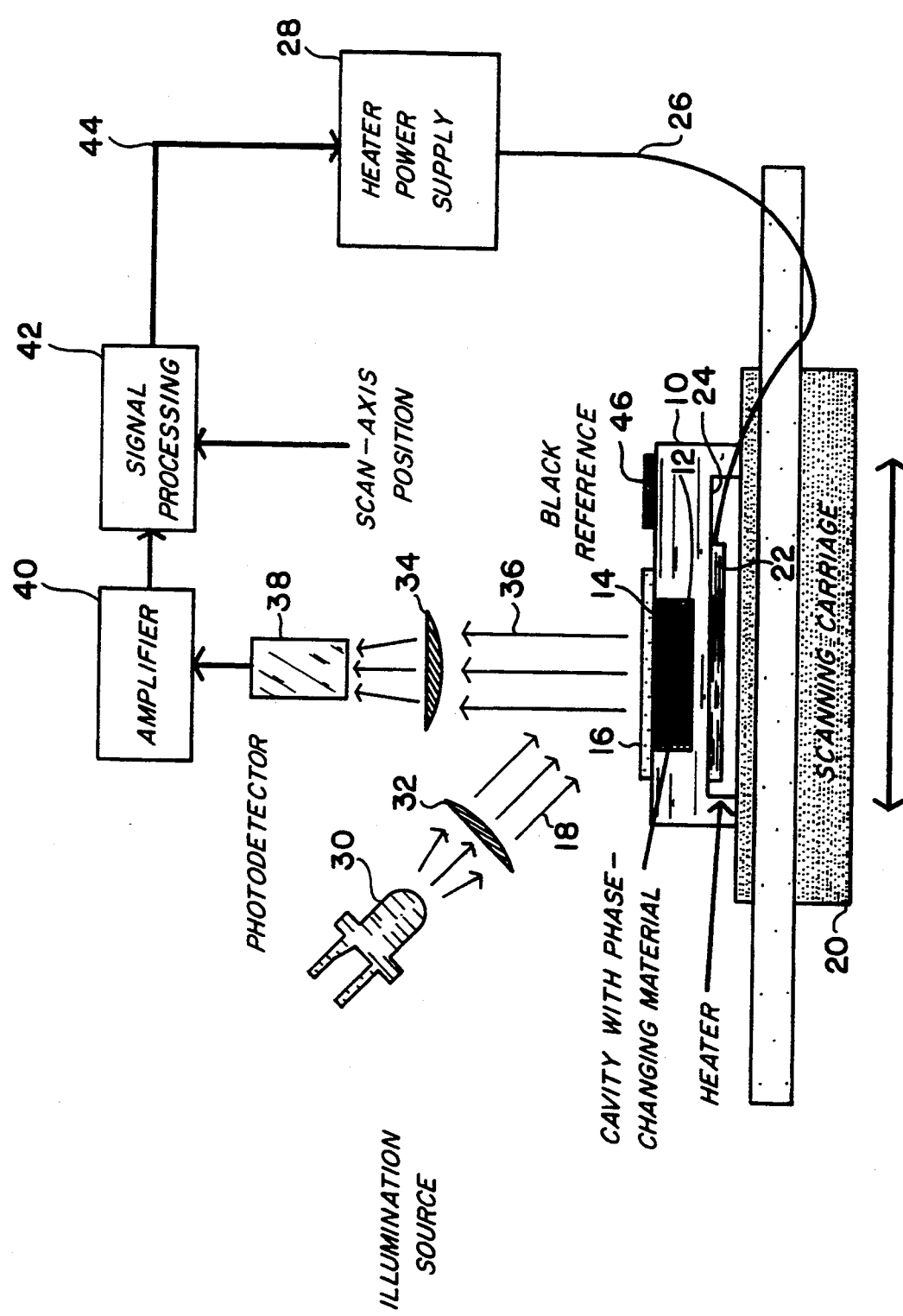
FIG. 3A is a functional system schematic level diagram of a preferred embodiment of the present invention.

Referring now to FIG. 3A, there is shown a schematic diagram of a scanning carriage 20 demonstrating the elements of temperature control in a hot-melt-ink type cartridge for an ink jet printer. A sensor 10 is mounted on the cartridge 20 and has the phase change material 14 and the window 16 positioned in place and corresponding to these previously described elements in FIGS. 1A and 2A. The sensor 10 is provided with a heater element 22 which is affixed to the undersurface 24 of the sensor 10 and is connected by way of a cable 26 to a heater power supply 28.

An illumination source 30 is positioned at the angle shown and may, for example, be a light emitting diode (LED) which is used with a convergent projection lens 32 to focus the light beam 18 as indicated through the window 16 and into the phase change material 14. The light is provided at a non-vertical incident angle so that it is not directly (i.e. specularly) reflected into the sensor 38, but rather diffusely reflected by the phase change material 14. Another convergent projection lens 34 is positioned as shown to receive the reflected light rays 36 from the phase change material 14 and focus these light rays 34 on a suitable photodetector 38.

The photodetector 38 is operative to generate an output detection signal which varies in magnitude as function of the illumination intensity of the received light 36 reflected from the phase change material 14. The lower the temperature of the ink and the phase change material, the more light is reflected from the opaque phase change material 14 to the photodetector 38. Conversely, when the ink temperature rises to or slightly above the desired ink temperature null point, the phase change material 14 becomes transparent, absorbing all light from the LED 30 and thereby reduces the light reflection 36 from the phase change material to approximately zero.

The output signal of the photodetector 38 is applied to suitable amplification electronics 40 which is operative to amplify the small output signal of the photodetector 38 before applying the signal to a further signal processing stage 42 which is in turn connected by way of output line 44 to the heater power supply 28 using conventional closed loop servo-mechanism techniques. The signal processing stage 42 is further connected to receive a scan axis position signal via line 46 for purposes to be described in further detail below.

The projection lens 32 concentrates the light 18 from the LED source 30 onto the cavity window 16 where the incidence angle minimizes the direct reflection from the surface of the window 16 into the photodetector 38. The receiver lens 34 images the window 16 onto the photodetector 38. An illumination of between 700 to 900 nanometers wavelength is preferred in this application because many plastics and epoxy encapsulants transmit these wavelengths. These materials are frequently used in the production of inexpensive, high efficiency light emitting diodes and sensitive photodetectors operative within this wavelength range.

Multiple sensor cavities as well as calibration targets using a black level reference 46 can be scanned by a single illumination source 30 and a single photodetector 38 since there is no physical contact between the imaged object and photodetector 38. FIG. 3A shows how mounting a temperature-sensing cavity and target on a scanning printhead carriage 20 simulating an ink jet printer allows each cavity and target to be imaged by a fixed illuminator 30 and photodetector 38. The object in view of the sensor 10 is always known from the scan axis servo position, and a measurement can be enabled by carriage position. For typical carriage speeds on the order of 30 centimeters per second and for the cavity window dimensions given above, the photodetector 38 is able to scan across each window 16 in about 10 milliseconds.

The field of view of the photodetector 38 should be smaller than the window 16 to thereby eliminate imaging cavity edges while viewing a field of temperature sensitive material 14 long enough to obtain a stable measurement with enough resolution of gray level. The scanning carriage 20 also permits the optional photodetection of bar codes (FIG. 6) which are placed on each print cartridge. These bar codes can be used to encode information about printhead operating energy, ink color and other parameters to be used by the printer controller (not shown).

Regarding the self calibration features of the present invention, variations in illumination, reflectivity and photodetector sensitivity require a high contrast between the black and white states of the sensor cavity 12 for reliable measurements based upon absolute reflectivity. The reliability of phase change detection can be significantly improved by comparing cavity reflectivity to a calibration sample 46 as indicated in FIG. 3A having a fixed reflectivity equal to the cavities nominal black value. On the other hand, a white reference instead of a black reference may also be used as indicated at position 46 in FIG. 3A.

Also in accordance with the present invention, a self calibrating system can be used and based upon relative reflectivity measurements and a digital comparator (not shown). The photodetector 38 in this case will image the black standard and sensor windows in turn, and a voltage controlled oscillator (not shown) may be used to convert the photodetector 38 output current into a pulse train having a frequency proportional to the intensity of the reflected light received from the sensor 10 in FIG. 3A. A digital processor (not shown) may be used to store the counts per sample time from each observation, and the counts from the sensor or sensors 10 may be compared to the counts from the black target 46, so that the sensor 10 is considered black if its counts fall within a specified range about the black measurement. Outside that range, the window is considered "not black".

For typical scanning carriage printers, the scan axis round trip time will be about 1 to 2 seconds, and this will be the sample time for the ink temperature and ink level servos when the carriage 20 passes by the photodetector 38 once per scan. Using this arrangement, the calibration target 86 and the sensor windows 16 are read for each print cartridge in turn, the heaters 22 are turned on and off for the carriage round trip as required and the process repeats itself on the next successive scan.

Referring again to FIG. 3A, the heater 22 controlling the ink delivery temperature must also heat the ink rapidly from room temperature to prepare the printhead for printing. The warm up cycle for a hot melt ink jet printer must be 40 seconds or less to be comparable with desktop laser printers. If, for example, a 100° C. rise is required in 40 seconds for hot melt ink warm up, operating the heater 22 for 2 seconds at this power level increases the ink temperature by 5° C. A simple on/off, sample time controller (not shown) using this heating rate will create instability about the regulation set point. Thus, it is clear that the heater 22 must operate at two power levels: (1) a high power level for rapid warm up, and (2) at a lower power level for temperature regulation. A fixed power supply voltage can be used in a two power servo loop such that the heater 22 can be turned off after a fraction of the sample time, such as for example 10 to 50%, and the heater voltage can be pulse width modulated at, for example, a 10 to 50% duty cycle.

Regarding the feature of ink level detection, the level of ink may be measured by the same means as the ink temperature is measured using a cavity in contact with the liquid ink. The cavity 12 will be heated only when the ink level is high enough to contact the backside of the cavity 12, and in this case, the hot ink will change the cavity state to black. When the ink level is low, the cavity 12 will cool and become white. The state of the sensor 10 is then used to control a means for melting ink on demand to refresh the liquid ink reservoir. The ink level sensor must be interpreted jointly with ink temperature, since the ink must be both liquid and hot enough to affect the ink temperature sensor 10. Here it may be necessary to employ a material in the ink level sensor with a switch point which is several degrees lower than the ink temperature sensor 10 in order to minimize interaction between the two.

Figure 3B:
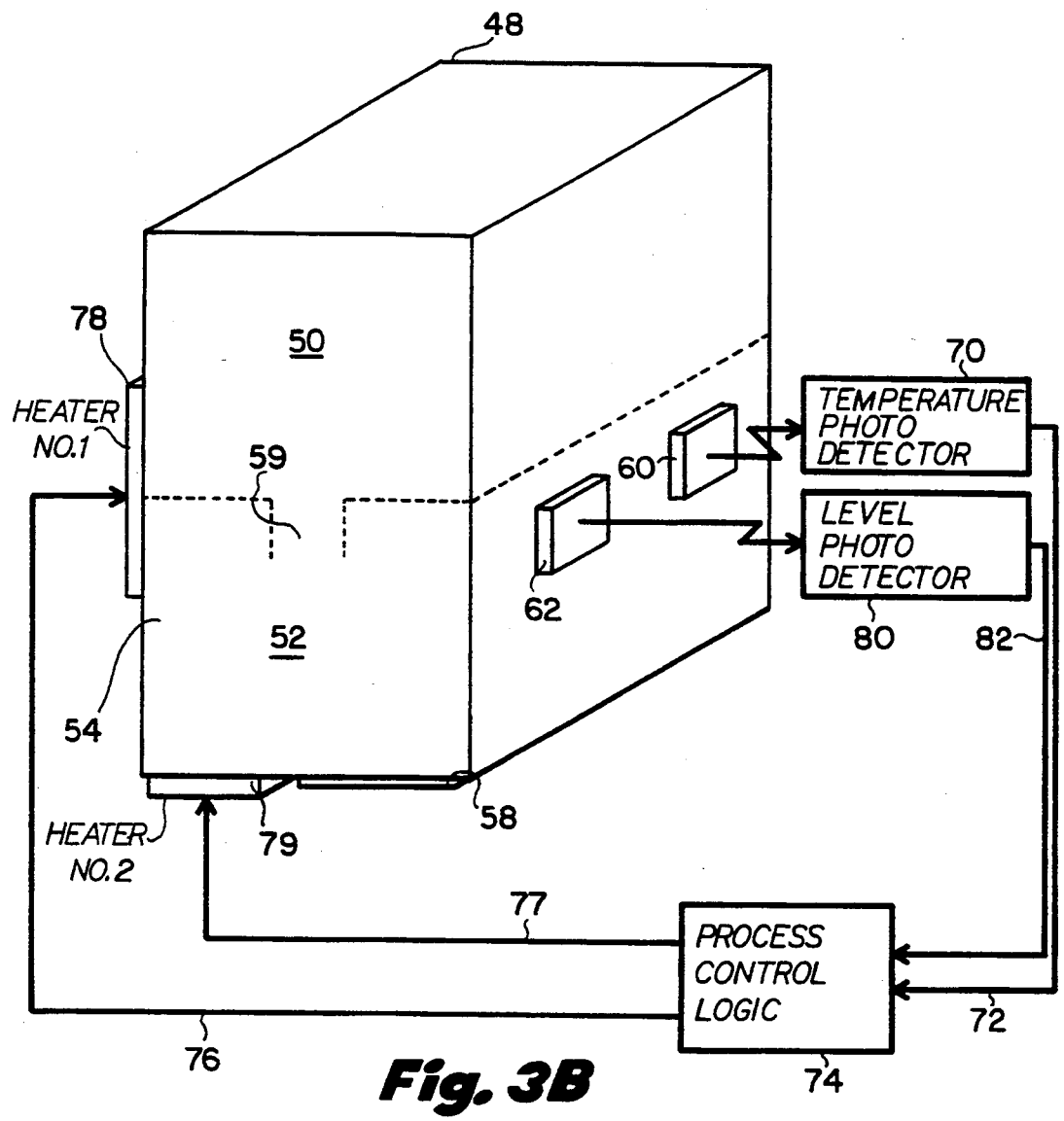
FIG. 3B is an abbreviated closed loop system diagram showing both ink level detection and control as well as ink temperature detection and control in accordance with the present invention.

Referring now to FIG. 3B, this figure shows an abbreviated, schematic functional level block diagram for both ink level and temperature control. In this process control system and method of both ink temperature and ink level control in accordance with a second embodiment of the invention, the reference numeral 48 broadly designates a pen body housing of the type having an upper compartment 50 therein filled with solid ink and a lower compartment 52 for receiving liquid ink through a passageway 54 in a partition wall 56 which separates the upper compartment 50 and the lower compartment 52. It is to be understood that the functional block diagram in FIG. 3B is intended to illustrate broad concepts of the present invention without being limited the mechanical and constructional details of exactly how the pen body housing is to be constructed. However, the present best mode of pen body construction would use in part the pen body design disclosed and claimed in copending application Ser. No. (PD 190263) of Ross R. Allen entitled "Monolithic Thermal Ink Jet Printhead For Phase Change Ink And Method of Operation", filed May 20, 1992, assigned to the present assignee and incorporated herein by reference.

A thin film printhead is designated generally as 58, and the liquid ink in the lower ink compartment 52 may be fed into the thin film printhead 58 using state of the art ink feed techniques and including both color and black ink applications. Obviously, in color ink applications, multiple ink feed compartments and paths (not shown) would be provided within the liquid ink compartment 52 in order to channel the proper color ink of cyan, yellow, magenta, and black, for example, into multiple heater resistor and orifice plate arrangements (again not shown), but well know to those skilled in the art.

In a typical closed loop process control system employing the invention shown in FIG. 3B, there will be a first, temperature sensor 60 of a chosen phase change material and a second, liquid level sensor 62 of either the same or different phase change material mounted on or within the pen body housing 48. The lower surfaces of these phase change sensor components 60 and 62 are located on the same horizontal plane which defines approximately the solid/liquid interface within the pen body housing 48. Preferably, the ink temperature sensor 60 will be mounted on a heat sink member (not shown) so as to always be in thermal contact with the liquid ink in the compartment 52.

On the other hand, the ink level sensor 62 will have its back surface contacting the liquid within the lower compartment 52 only when the ink level within the compartment 52 reaches its desired vertical height. When the ink liquid level in the compartment 52 falls below the level of the ink level sensor 62, this action will cause the ink level sensor 62 to cool, turn opaque, and thereby increase the reflectivity and light into an ink level photodetector 80 and cause a closed loop ink level control signal to be propagated via line 82 into the process control logic stage 74. The process control logic 74 stage in turn will generate an output error null control signal on feedback line 76 which is in turn applied to an internal pen body heater element 78 to cause the heater element 78 to increase the temperature within the upper compartment 50 of the pen body housing 48. This action in turn increases the flow of liquid ink across the passageway 54 into the lower compartment 52 to thereby raise the level of ink within the lower compartment 52. This action causes the level of ink therein to again contact the back surface of the ink level sensor 62 and thereby decrease the sensor reflectivity and signal level into the photodetector 80.

With the temperature sensor 60 being mounted on a heat sink which is always in contact with the liquid ink in the lower compartment 52, the temperature sensor 60 operates continuously in response to temperature changes within the liquid ink in the compartment 52 and generates variable reflectivity optical signals into the temperature photodetector 70 in a manner described earlier with reference to FIG. 3A. The temperature photodetector 70 in FIG. 3B corresponds to the photodetector 38 previously described in FIG. 3A, and the output of the temperature photodetector 70 is connected by way of line 72 as a second input into the process control logic stage 74. The process control logic stage 74 in turn generates an ink temperature error signal on line 77 which is applied to a temperature heater element 79 located near a bottom wall of the pen body housing 79. This latter feedback loop containing elements 70, 72, 74, 77, and 79 thus serves to provide precise control of the ink in the pen body housing 48 after the ink level feedback control loop 80, 82, 74, 76, and 78 has operated to ensure that the level of ink in the pen body housing is at least as high as the ink temperature sensor. Thus functionally, the heater elements 78 and 79 in FIG. 3B correspond, respectively, to the internal heater 92 and to the heater block 100 in FIG. 3C described in more detail below.

Thus, using the system shown in FIG. 3B, ink level is measured by the same means as ink temperature by using a cavity in contact with the liquid ink. This cavity (not shown in FIG. 3B) for the ink level sensor 62 will heated only when the ink level is high enough to wet the backside of the cavity. In this case, the hot ink will change the cavity state to "black". When the ink level is low, the cavity will cool and become "white". The state of the sensor 62 in this embodiment is then used to control a means for melting ink on demand to refresh the ink reservoir 52 through the passageway 59 in the partition 56. The ink level sensor in FIG. 3B must thus be interpreted jointly with ink temperature inasmuch as ink must be both liquid and hot enough to affect the ink temperature sensor 60. In addition, it may be necessary to employ a material for the ink level sensor 62 with a switch point several degrees lower than the ink temperature sensor in order to minimize undesirable interaction between sensors 60 and 62.

Referring now to FIGS. 3C and 3D, there is no correspondence therein of the reference numerals shown in these figures to the reference numerals shown in FIG. 3B due to the general nature of 3B and the detailed nature of FIGS. 3C and 3D. That is, except for the pen body housing which is designated generally as 48 in FIG. 3C and includes an outer shell or casing 84 as the major component thereof. The other major components of FIG. 3C include a flex circuit 86, an adhesive sealer 88, and a sensor assembly 90. The ink container casing 84 may be constructed generally in accordance with the teachings of my above-identified copending application Ser. No. (PD 190263) and includes therein an internal heater element 92 mounted as shown on the back wall 94 of the casing 84.

A suitable insulator 96 is positioned as shown between the lower wall 98 of the casing 84 and a heater block 100. The heater block 100 includes therein an ink supply path 102 through which ink is fed from the ink container casing 84 to a thermal ink jet printhead of known construction.

A flex circuit device 86 of the generally L-shaped configuration has a thermal ink jet printhead 104 mounted on its horizontal surface 106, and a flex circuit interconnect pattern 108 is developed in a known manner so as provide drive signals from an external source and into the thermal ink jet printhead 104. The front surface 110 of the flex circuit 86 includes therein a pair of cylindrical windows 112 and 114 which are aligned, respectively, with the ink level sensor (124 and 62) and the temperature sensor (122 and 60) located as previously indicated at the liquid/solid interface and within or adjacent to the ink container casing 84. These windows 112 and 114 are further aligned with matching windows 116 and 118 within the adhesive sealer member 88 which operates to seal the sensor assembly 90 to the front wall 110 of the flex circuit 86.

The sensor assembly 90 includes therein a reference black target element 120, a temperature sensor 122, and an ink level sensor 124. The temperature and level sensors 122 and 124 are thus aligned with the openings 118 and 116 in the adhesive sealer 88 and with the windows 114 and 112 in the flex circuit 86, respectively. The sensor assembly 90 further includes a bar code 126 located on the left hand side of the sensor assembly, and this bar code 126 operates to identify various parameters of the thermal ink jet pen.

In operation, the temperature and level sensors 122 and 124 correspond, respectively, to the functionally equivalent temperature and level sensors 60 and 62 previously described with reference to FIG. 3B. When the ink level in the ink supply path 102 becomes too low, the ink level sensor 124 becomes opaque when the level sensor 124 cools and thereby increases the level of feedback signal which is applied to the internal heater element 92. The increased heat level supplied by the internal heater element 92 (which corresponds to the level heater 78 in FIG. 3B) thereby causes the ink level in the ink supply path 102 to rise to the level of both the ink level and ink temperature sensors 124 and 122, respectively. Now the ink temperature sensor 122 can adjust with precision the ink temperature within the pen body housing by the application of a control signal to the heater block 100 which corresponds to the functional temperature heater 79 in FIG. 3B.

The pen construction shown in FIGS. 3C and 3D represents a unique and compact housing of rectangular cross section geometry and of the type which can be readily fitted into state of the art thermal ink jet print carriages. There are numerous references in the art to the general construction of flex circuits and the thin film resistor type printhead 104, including numerous patents coassigned to the Hewlett Packard Company assignee herein. Therefore, these constructional details will not be described further herein.

Figure 4A:
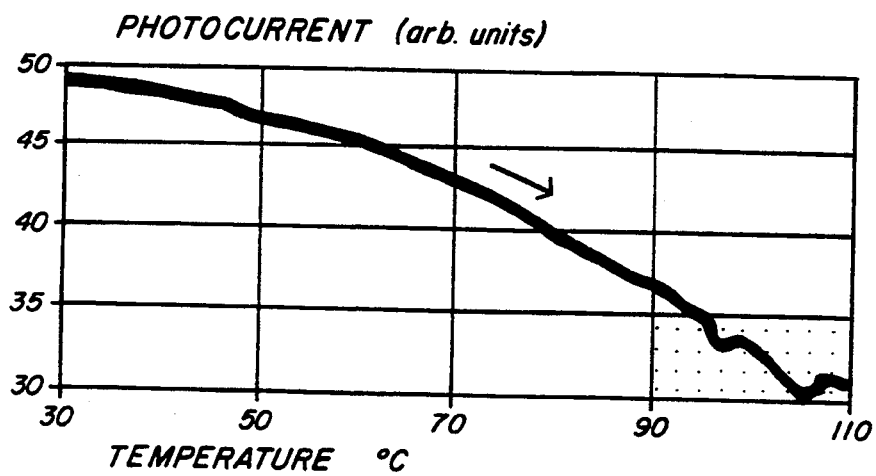
FIGS. 4A, 4B, and 4C are photodetection and phase change diagrams, respectively, relating to the melting and freezing temperature control of the hot melt ink within the ink containing cavity of FIG. 3A.
Figure 4B:
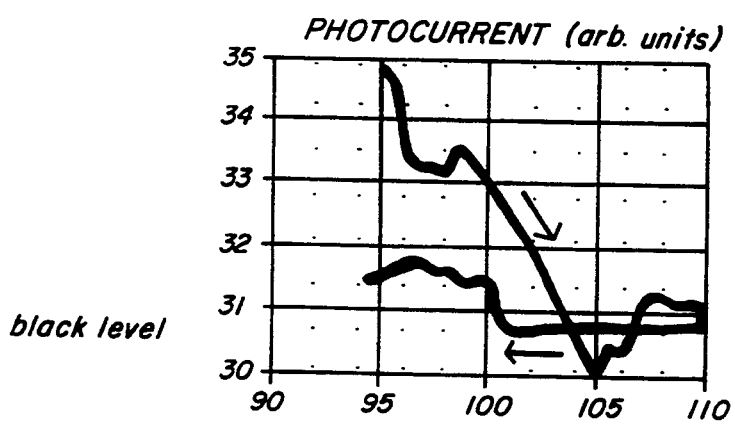
Figure 4C:
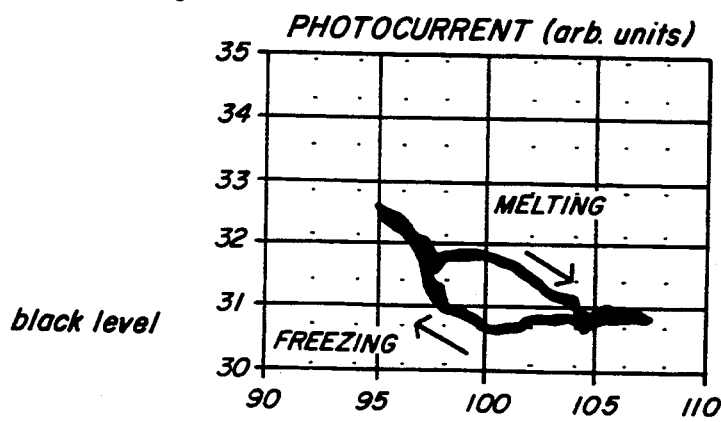

Referring now in sequence to FIGS. 4A, 4B, and 4C, these figures are three plots of the photocurrent, in arbitrary units on the vertical axes, at the output of the photodetector 38 in FIG. 3A as a function of the temperature of the crystalline filled cavity 12 on the horizontal axes. FIG. 4A shows a typical response of photocurrent at the output of the photodetector 38 as a function of temperature as a cavity 12 filled with the crystalline material Kenamide-S is slowly heated and cooled. It should be particularly noted that the photocurrent in FIG. 4A is a monotonic function of temperature between room temperature and the melting point of the hot melt ink. This phenomenon provides a mechanism by which the warm-up heater in a hot melt ink printer can verify that the ink is heating before the ink delivery temperature is reached. This feature also provides a means for the printer to monitor the progress of this process and verify its proper operation.

Referring now to FIG. 4B, it should be noted that the hysteresis in photocurrent in FIG. 4B is about its melting point since Kenamide-S freezes at a lower temperature than it melts. This fact limits the regulation accuracy of the system since temperature is a multiple valued function of photocurrent from the photodetector 38.

Comparing FIGS. 4B and 4C, the characteristics of this hysteresis are seen to be rate sensitive, and a degraded response occurs with higher rates of heating and cooling as indicated in FIG. 4C.

Referring now to FIGS. 5A through 5D, there is shown a sensor design which integrates into a single package temperature and ink level cavities and a black reference mark. These cavities may be obround to separate a trapped gas bubble from the portion of the window imaged by the photodetector 38. This bubble provides the necessary volumetric compliance to allow the light reflection material to undergo a volume change with phase change without introducing high stresses in the encapsulant. These materials typically expand about 10 to 15% upon melting, and this bubble floats to the top of the chamber during use. Best results were observed using a flat bottomed cavity, and if the bubble trap is shallower, bubbles forming in the lower region of the cavity will trap at the deep to shallow transition. A deeper bubble trap may not completely thaw, again trapping bubbles below the top of the chamber.

The obround cavities 130 and 132 shown in FIGS. 5A through 5D are formed in a metal plate 134 approximately 0.4 to 1.0 millimeters in thickness. Preferably, the metal plate 134 is anodized or chemically treated to form a black surface finish, and slots 136 and 138 in the plate serve to thermally isolate each cavity and improve encapsulant adhesion. Features in the metal plate such as the break off and support tabs 140, 142, 144, and 146 may be coined and punched inexpensively, and the plate 134 may be electroformed economically because dimensions affecting the plating thickness are not critical to sensor performance.

Figure 5A:
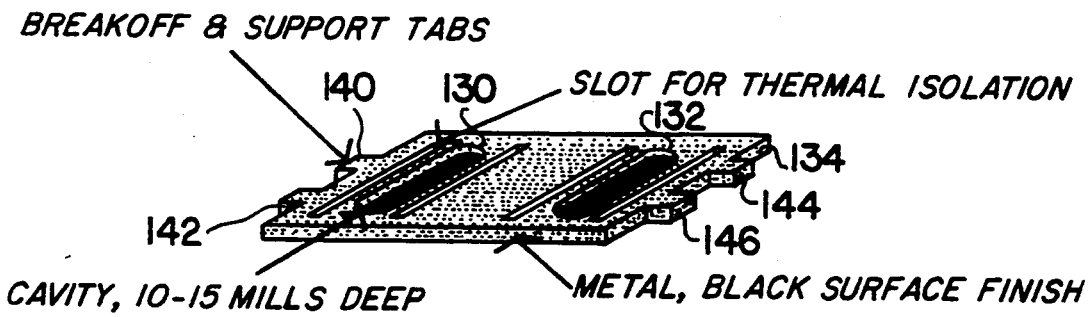
FIGS. 5A, 5B, 5C, and 5D are isometric views illustrating a preferred sensor design for use in the system embodiment shown in FIGS. 3A and 3B.
Figure 5B:
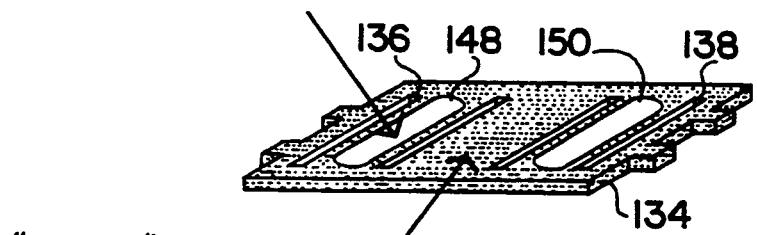
Figure 5C:
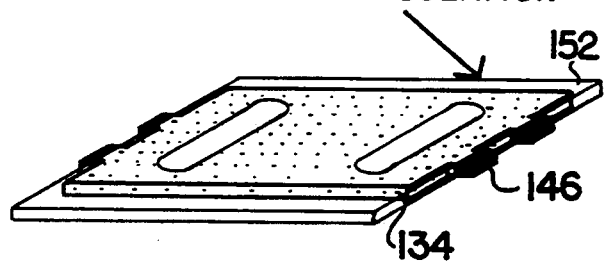

These obround cavities 130 and 132 shown in FIGS. 5A are filled with a phase change material 148 and 150 as shown in FIG. 5B and encapsulated with an infrared transmissive material 152 as shown in FIG. 5C. In FIG. 5C, the substrate 134 in FIG. 5B has been flipped over so that the obround filled cavities 130, 132 with the thermosensitive material 148 and 150 are facing down against the upper surface of the encapsulation layer 152. It is essential that an air bubble be trapped in the cavities 130 and 132 during encapsulation, and if desired, the cavities 130 and 132 can be vented to allow for expansion. However, the latter design is not a preferred embodiment of the invention, since a loss of material may result if the orientation of the device is changed while the cavity material is liquid.

Figure 5D:
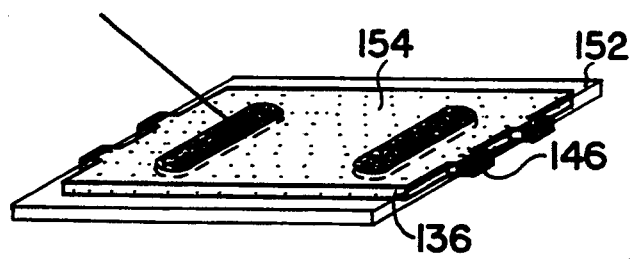

The backside 154 of the metal cavities 130 and 132 extends outside of the encapsulant 152 to provide a good thermal contact with the process under measurement. This is shown in FIG. 5D.

The sensor shown in FIGS. 5A through 5D is placed in contact with a heat spreader (not shown) which conducts heat through the ink in the liquid phase reservoir in the print cartridge body. The heat flowing into the spreader is controlled by the ink temperature regulator, and behind the ink level sensor is a gap filled with liquid ink. As before, a low level ink in this gap causes the ink level sensor to become opaque and call for an increased feedback signal to the interior heater within the pen body housing to melt more of the solid phase ink therein.

Figure 6:
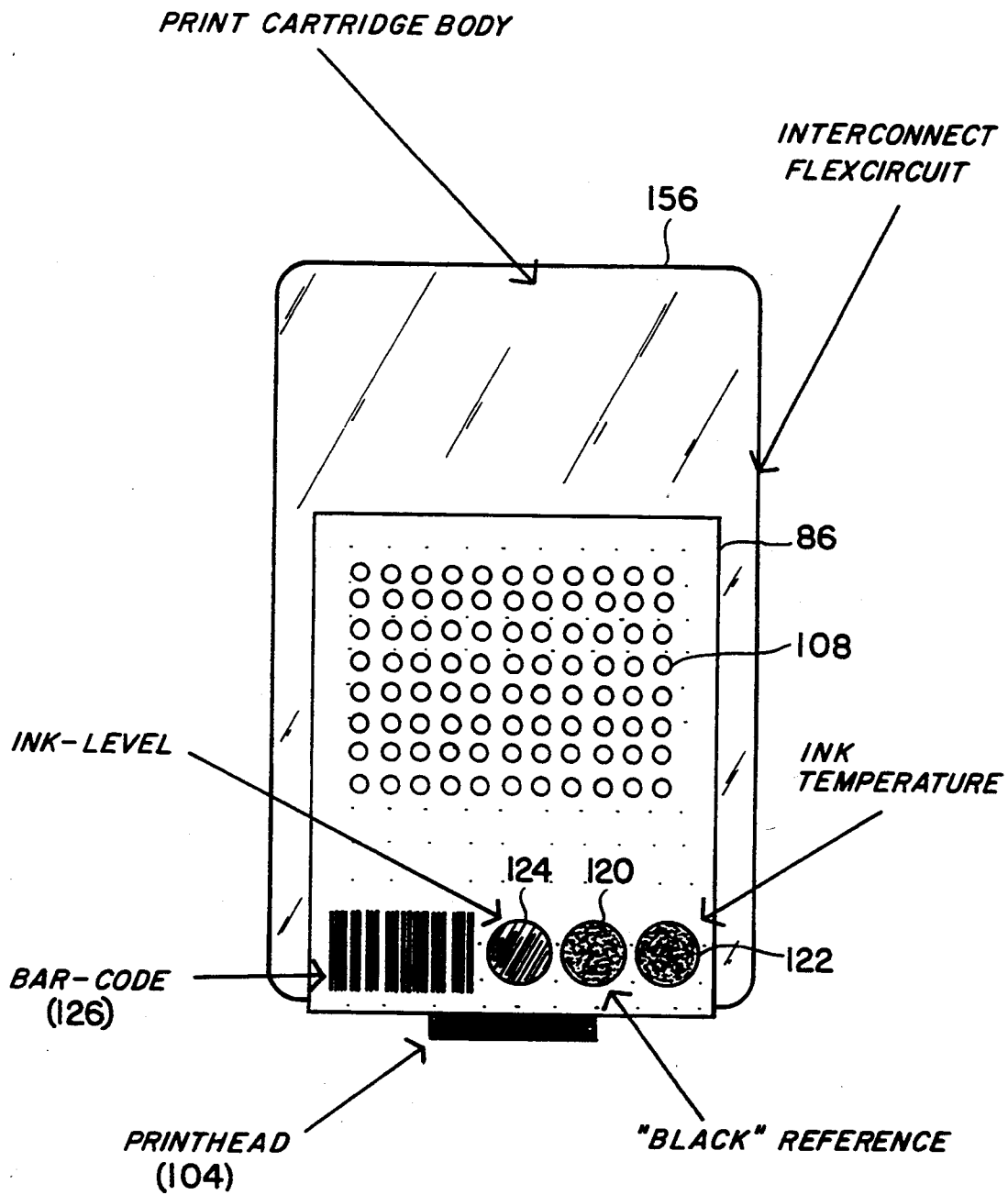
FIG. 6 is an isometric view showing the entire hot melt ink print cartridge using the remote ink level/temperature sensing method and system in accordance with the present invention.

Referring now to FIG. 6, this figure shows a design for a hot melt thermal ink jet print cartridge 156 employing the method and system of the present invention for remote ink temperature and ink level sensing. The reference numerals in FIG. 6 correspond to the reference numerals in FIGS. 3C which identify like components in these two figures. The sensor cavities and black reference are viewed through holes in the body of the cartridge 156 and in a flex circuit tape 86. The windows 120, 122, and 124 in FIG. 6 are exaggerated for clarity; however, practical diameters of these windows will be about 2 to 4 millimeters to provide minimal interference with electrical conductors.

Also, as shown in FIG. 6, a bar code 126 is provided on the print cartridge 156 which can be read by the photodetector 38 in FIG. 3B. The bar code 126 may contain, for example, information on the drive energy of the printhead, ink color, or other operating parameters of the cartridge 156. Since the sensors and bar codes are in different planes, the photodetector's field of view in the flex circuit plane sets spatial frequency limits on bar code lines and spaces.

Thus, there have been described a significant number of novel features of this invention, including the use of remote thermometry to regulate temperature and ink level in a phase change ink jet printer. A self calibrating, temperature sensing scheme using an absolute temperature reference (materials phase change) has been provided, and the reflected light temperature sensor employs materials not currently used as phase change temperature indicators. A multi-path photodetector and a signal processing circuit is provided for both ink temperature and ink level control servos, and a single photodetector and single signal processing circuit for each of ink temperature and ink level control servos in a printer with multiple print cartridges. Using gray level information in this scheme of remote thermometry, it is possible to determine that the print cartridges are warming up before the operating temperature thereof is reached. In addition, bar codes for control of printhead driver energy may be detected by the same sensor used for remote thermometry control.

In addition to the above novel features, the present invention provides an absolute temperature reference and a means for self calibration. A single light source and a single photodetector are able to manage multiple print cartridges, and this method does not add interconnect pads, carriage PC board circuitry or trailing cables to the product beyond that required for heater power. The precision of mechanical alignment between the print cartridges and the photodetector is assured by normal tolerances within the scan axis mechanism of the system, and the scan axis servo position can be used to enable and identify measurements. Temperature sensors may be sealed within the cartridge body without passing low power analog signals through an electrical interconnect as is required by thermocouples, thermistors, and temperature sensitive resistors. In addition, the system cost and complexity will be significantly less than that required of conventional means for precision temperature measurement.

Various modifications may be made in and to the above described embodiments without departing from the spirit and scope of this invention. These may include, for example, the use of liquid crystal materials to replace the above described phase change materials and the use of flexible backing materials to replace the metallic base plate in FIG. 5D. Accordingly, it is to be understood that these and other design, system, method, and apparatus modifications are within the scope of the following appended claims.

We claim:

1. A method for regulating the temperature of a hot melt ink for a thermal ink jet printer which includes the steps of:
   a. providing a selected material adjacent to a source of hot melt ink and having a refractive index which varies in a known manner as a function of temperature,
   b. projecting light onto a surface of said selected material and thereby reflecting light therefrom at an intensity level which is proportional to the temperature level within said hot melt ink,
   c. sensing the intensity level of said reflected light and generating a temperature control signal in response thereto, and
   d. processing said temperature control signal to a heater element for said hot melt ink for regulating the temperature thereof.

2. A system for regulating the temperature of a hot melt ink for a thermal ink jet printer which comprises:
   a. means providing a selected material adjacent to a source of hot melt ink and having a refractive index which varies in a known manner as a function of temperature,
   b. means for projecting light onto a surface of said selected material and thereby reflecting light therefrom at an intensity level which is proportional to the temperature level within said hot melt ink,
   c. means for sensing the intensity level of said reflected light and generating a temperature control signal in response thereto, and
   d. means connected between said sensing means and a heater element for processing said temperature control signal to said heater element for said hot melt ink for regulating the temperature thereof.

3. A method for simultaneously sensing the liquid level and temperature within a pen body housing to control a melt rate of a solid ink contained therein, the pen body housing including a plurality of heater elements located adjacent to the pen body housing, and a plurality of phase change material components, each of said components having a reflectivity and each of said components housing, the method comprising the steps of:
   a. detecting the reflectivity of each of the phase change material components to obtain detection signals; and
   b. processing the detection signals from the components to control the heater elements and in turn control the melt rate of the solid ink.

4. A system for simultaneously sensing the liquid level and temperature within a pen body housing comprising
   a. a plurality of phase change material components, each of the components having a reflectivity, and each of the components being located within or adjacent to the pen body housing;
   b. a plurality of heater elements located adjacent to the pen body housing;
   c. a solid ink having a melt rate;
   d. means for detecting the reflectivity of each of the phase change material components to obtain separate detection signals;
   e. means connected to the detection means for processing the separate detection signals to control the heater elements and in turn control the melt rate of solid ink.

5. The system defined in claim 4 wherein said means for detecting the reflectivity of said phase change material components includes:
   a. a first, ink level photodetector optically coupled to a first of said phase change material components,
   b. a second, ink temperature photodetector optically coupled to a second of said phase change material components, and
   c. process control logic means connected between said ink level photodetector and said ink temperature photodetector and said heater elements adjacent to said pen body housing for generating closed loop process control signals to said heater elements.

6. The system defined in claim 5 wherein said first phase change material component and second phase change material component are disposed in adjacent cavities on a substrate, whereby said substrate is adapted for mounting at a liquid-solid interface on the pen body housing.

7. A system for simultaneously controlling the temperature and level of liquid ink at a liquid/solid interface within a pen body housing, including, in combination:
   a. first phase change sensor component and second phase change sensor component mounted within or adjacent to the pen body housing adjacent the liquid/solid interface,
   b. ink temperature detection means optically coupled to said first phase change component,
   c. ink level detection means optically coupled to said second phase change component,
   d. a plurality of heater elements mounted adjacent said pen body housing and adjacent to solid ink therein, and
   e. closed loop feedback control means connected between outputs of said ink temperature detection means and said ink level detection means and said heater elements for providing closed loop control signals to said heater elements in response to changes in reflectivity at said first phase change material component and the second phase change material component.

8. An ink jet pen useful for dispensing hot melt ink including, in combination:
   a. an ink container casing;
   b. a plurality of heater elements adjacent to the ink container casing;
   c. a heater block located adjacent a bottom wall of said ink container casing and an insulating member separating the bottom wall from said heater block;

d. sensor assembly means for measuring ink temperature and ink level of said hot melt ink, said sensor assembly means being affixed to said ink container casing, and having therein an ink temperature sensor and as an ink level sensor, both sensors operative in response ink within the ink container casing such that an optical property of the ink level sensor depends upon a level of said hot melt ink; and e. process control logic means connected between the sensor assembly means and heater elements for generating closed loop process control signals to the separate heater elements to thereby control the ink level and temperature of ink within the casing.

9. The pen defined in claim 8 wherein the ink container casing has a liquid to solid interface and further comprises a. a substrate having adjacent cavities being adapted for mounting at the liquid to solid interface;

b. a first phase change material component disposed in one cavity on the substrate; and c. a second phase change material component disposed on the substrate in another cavity that is adjacent to the cavity of the first phase change material component.

10. The pen defined in claim 8 which further includes a flex circuit member mounted to a side wall of said ink container casing, and a thermal ink jet printhead mounted on one surface of said flex circuit member and in fluid communication with ink from an ink supply path into said ink container casing.

11. The pen defined in claim 10 which further includes an adhesive sealer bonding said sensor assembly means to an upstanding wall of said flex circuit member and having windows therein aligned with windows in said upstanding wall of said flex circuit member and further aligned to said temperature and level sensors within said sensor assembly means for providing optical coupling between said ink temperature and ink level sensors within said sensor assembly means and ink within said ink container casing.

12. The pen defined in claim 11 wherein said sensor assembly means further includes a reference black target and a bar code thereon whereby said reference black target is operative in combination with said ink temperature and said ink level sensors within said sensor assembly means and said bar code is operative to identify one or more operational parameters of said pen.

13. The pen defined in claim 8 which further includes:

a. first phase change sensor component and second phase change sensor component mounted within or adjacent to said casing, the first phase change component being responsive to the temperature of the liquid phase of the hot melt ink, and the second phase change component being placed near the nominal position of the desired ink level of the liquid phase of the hot melt ink, b. ink temperature detection means optically coupled to the first phase change component, c. ink level detection means optically coupled to the second phase change component, d. a first heater element disposed adjacent to said casing so as to raise the temperature of the liquid phase of the hot melt ink, and a second heater element disposed adjacent to said casing so as to melt the ink solid phase on demand, and e. closed loop control means connected between the ink temperature detection means and the ink level detection means and said first heater element and said second heater element respectively, for controlling the liquid phase temperature and melt rate of the phase within the casing.

14. The pen defined in claim 13 which further includes a flex circuit member mounted to a side wall of said ink container casing, and a thermal ink jet printhead mounted on one surface of said flex circuit member and in fluid communication with ink from an ink supply path into said ink container casing.

15. The pen defined in claim 14 which further includes an adhesive sealer bonding said sensor assembly means to an upstanding wall of said flex circuit member and having windows therein aligned with windows in said upstanding wall of said flex circuit member and further aligned to said ink temperature and ink level sensors within said sensor assembly means for providing optical coupling between said ink temperature and ink level sensors within said sensor assembly means and ink within said ink container casing.

16. The pen defined in claim 15 wherein said sensor assembly means further includes a reference black target and a bar code thereon whereby said reference black target is operative in combination with said ink temperature and ink level sensors within said sensor assembly means and said bar code is operative to identify one or more operational parameters of said pen.

17. The pen defined in claim 13 wherein said first heater element is an internal heater disposed on an inside wall of said casing and said second heater element is a block heater upon which said casing rests.

18. The pen defined in claim 17 which further includes a flex circuit member mounted to a side wall of said ink container casing, and a thermal ink jet printhead mounted on one surface of said flex circuit member and in fluid communication with ink from an ink supply path into said ink container casing.

19. The pen defined in claim 18 which further includes an adhesive sealer bonding said sensor assembly means to an upstanding wall of said flex circuit member and having windows therein aligned with windows in said upstanding wall of said flex circuit member and further aligned to said temperature and level sensors within said sensor assembly means for providing optical coupling between said ink temperature and ink level sensors within said sensor assembly means and ink within said ink container casing.

20. The pen defined in claim 19 wherein said sensor assembly means further includes a reference black target and a bar code thereon whereby said reference black target is operative in combination with said ink temperature and said ink level sensors within said sensor assembly means and said bar code is operative to identify one or more operational parameters of said pen.

* * * * *